Oct. 10, 1950   A. J. CHASE   2,525,524
ELECTROMAGNETIC CONTROL MEANS TO TUNE
ORGAN PIPES TO JUST PITCH
Filed June 21, 1948   5 Sheets-Sheet 1

INVENTOR
ARTHUR J. CHASE
BY
Semmes, Keegin, Robinson + Semmes
ATTORNEYS

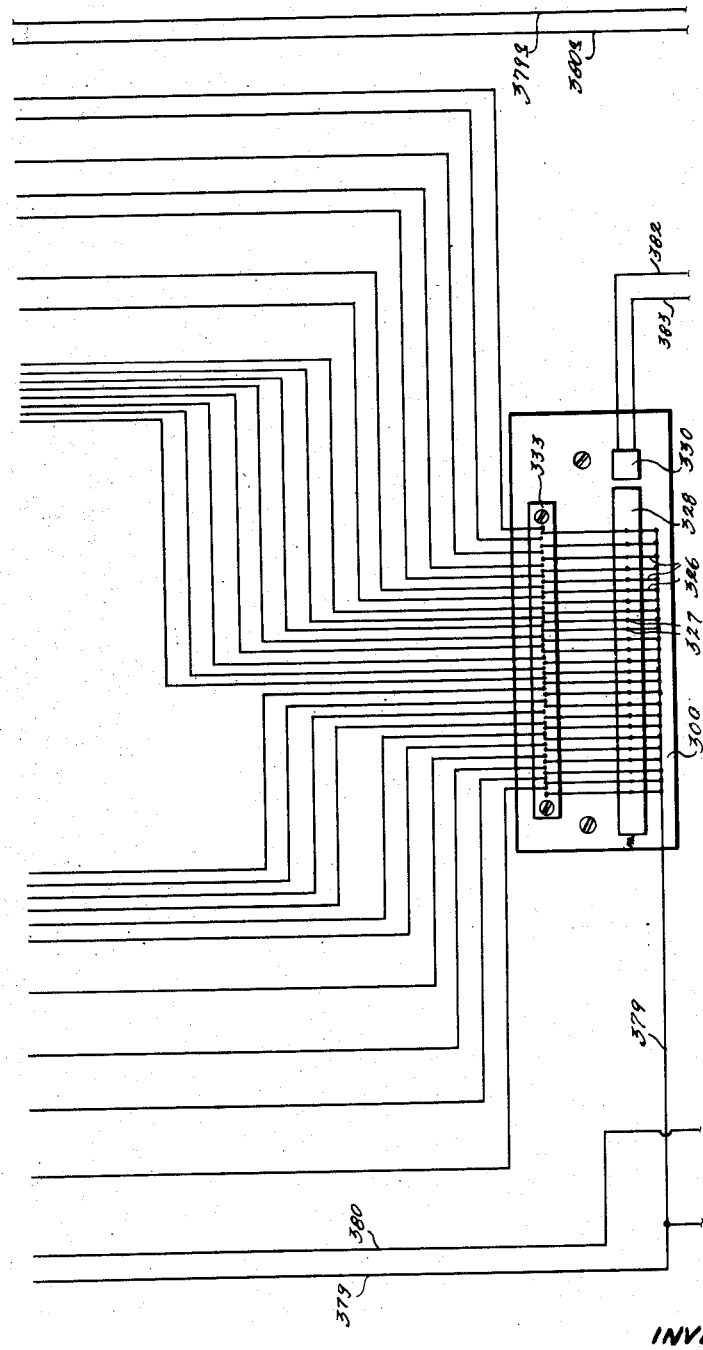

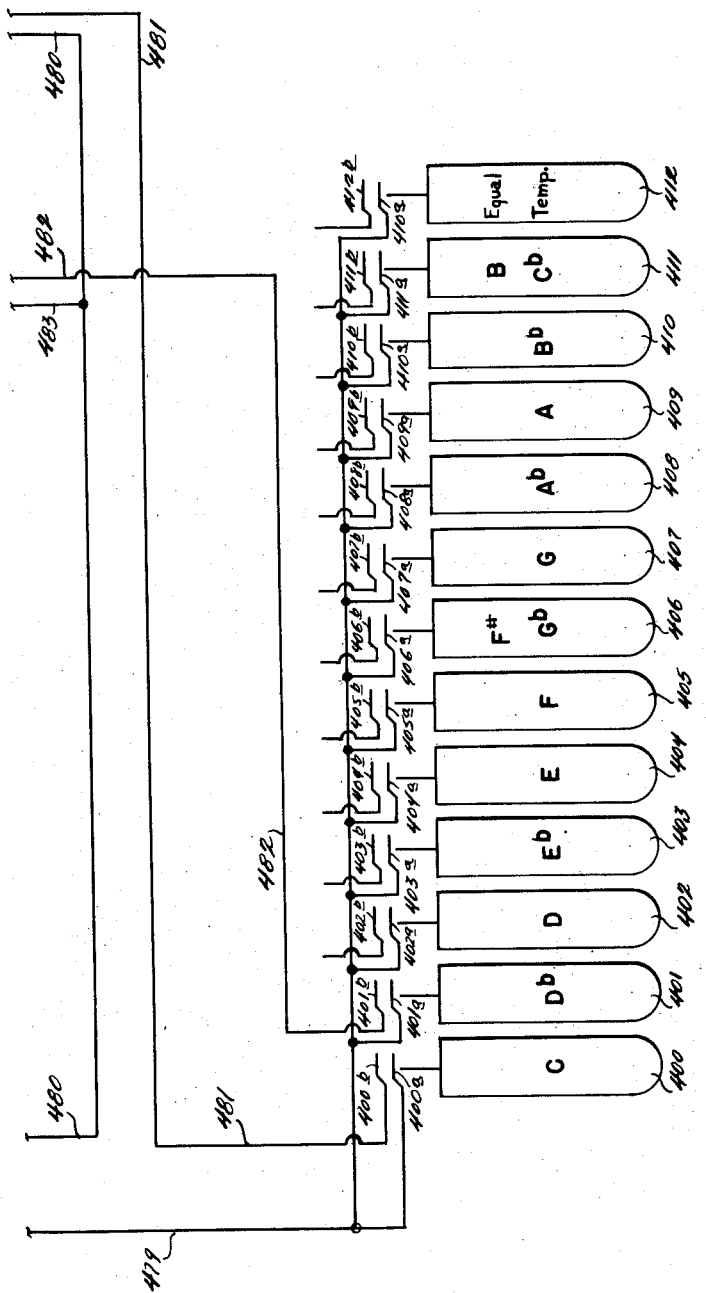

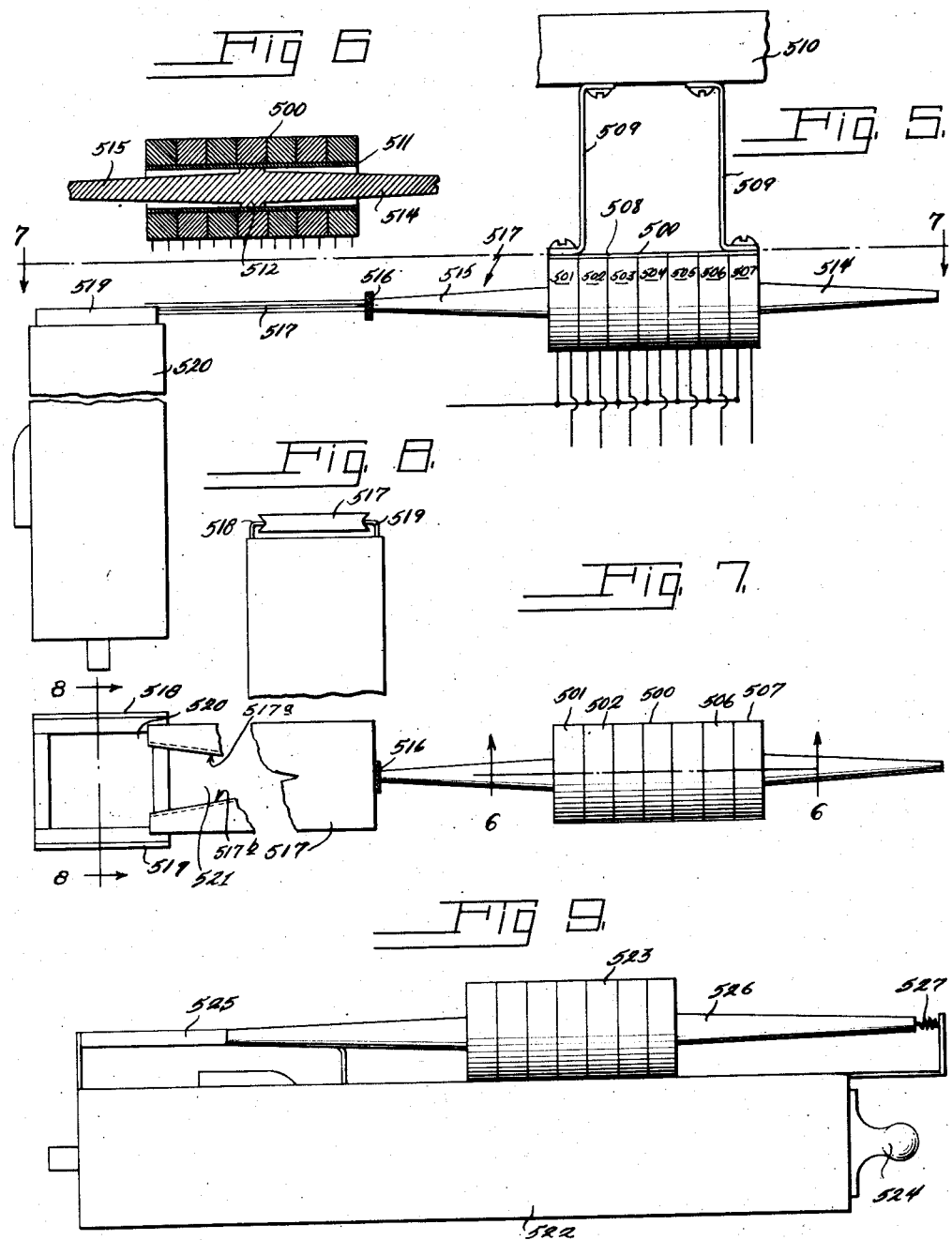

Patented Oct. 10, 1950

2,525,524

UNITED STATES PATENT OFFICE 2,525,524

ELECTROMAGNETIC CONTROL MEANS TO TUNE ORGAN PIPES TO JUST PITCH

Arthur James Chase, Los Angeles, Calif.

Application June 21, 1948, Serial No. 34,257

9 Claims. (Cl. 84—331)

This invention relates to pipe organs in general. More particularly, this invention relates to pipe organs in which the pipes may be automatically tuned to just pitch in different keys.

An object of this invention is to provide an organ with an electro-magnetic control which can be set to tune the organ pipes to just pitch.

Another object of this invention is to provide an organ with manual devices to operate a control that tunes the organ pipes to just pitch in different keys.

A further object of this invention is to provide an organ with manual devices to operate electromechanically controlled shades that automatically tune the organ pipes to just pitch in whatever key the organ player decides to play.

Still another object of this invention is to provide an arrangement whereby an organ may be tuned to play in a scale in which all intervals are perfect intervals and which may be changed to any key.

Another object of this invention is to provide solenoid controlled shades on organ pipes to change the tuning of the organ pipes from the tonic to supertonic, mediant, sub-dominant, dominant and sub-mediant chords, all correct in any given key in each of the octaves of the organ.

A further object of this invention is to provide a solenoid for controlling the shade of an organ pipe, the solenoid having an armature with a central cylindrical portion and tapered end portions extending axially of the solenoid.

Still another object of this invention is to provide a multiple section solenoid winding and armature associated therewith for controlling the shade of an organ pipe, said armature having a central cylindrical section smaller in width than the width of one of the solenoid sections, said armature also having tapered portions extending from said cylindrical section making it possible for the armature to make a dead stop in the solenoid section that is energized.

Other and further objects of this invention will be apparent to those skilled in the art to which it relates from the following specification, claims and drawings.

In accordance with this invention there is provided an electro-magnetic control for the shades employed with the pipes of a pipe organ for the purpose of raising or lowering the pitch to the perfect interval or just pitch in any desired key. The electro-magnetic control of this invention employs a plurality of seven section solenoids each provided with an armature to control the shade associated with the corresponding organ pipe. The sections of each of the solenoids are connected to selected contacts of thirteen electromagnetic switches that are controlled by tablets designated by the legends C, D flat, D, E flat, E, F, F sharp or G flat, G, A flat, A, B flat, B or C flat and "equal tempered," respectively, whereby the tuning shades associated with the organ pipes may be controlled by said tablets to tune the organ pipes to just pitch or perfect intervals in any of the keys designated on said tablets. Other features of this invention will be described in detail in the following specification and illustrated in the drawings in which, briefly:

Figures 1, 2, 3 and 4 when taken together illustrate a schematic wiring diagram of part of an embodiment of this organ control;

Figure 5 is a detailed view showing a multiple section solenoid organ pipe shade control;

Figure 6 is a view taken along the line 6—6 of Figure 7;

Figure 7 is a detailed view showing the multiple section solenoid for controlling an organ pipe taken along the line 7—7 of Figure 5;

Figure 8 is a view of the guides supporting the tuning tablet on the organ pipe; and, Figure 9 is a side view of a closed organ pipe showing the tuning shade positioned on the mouth thereof.

Figure 1:
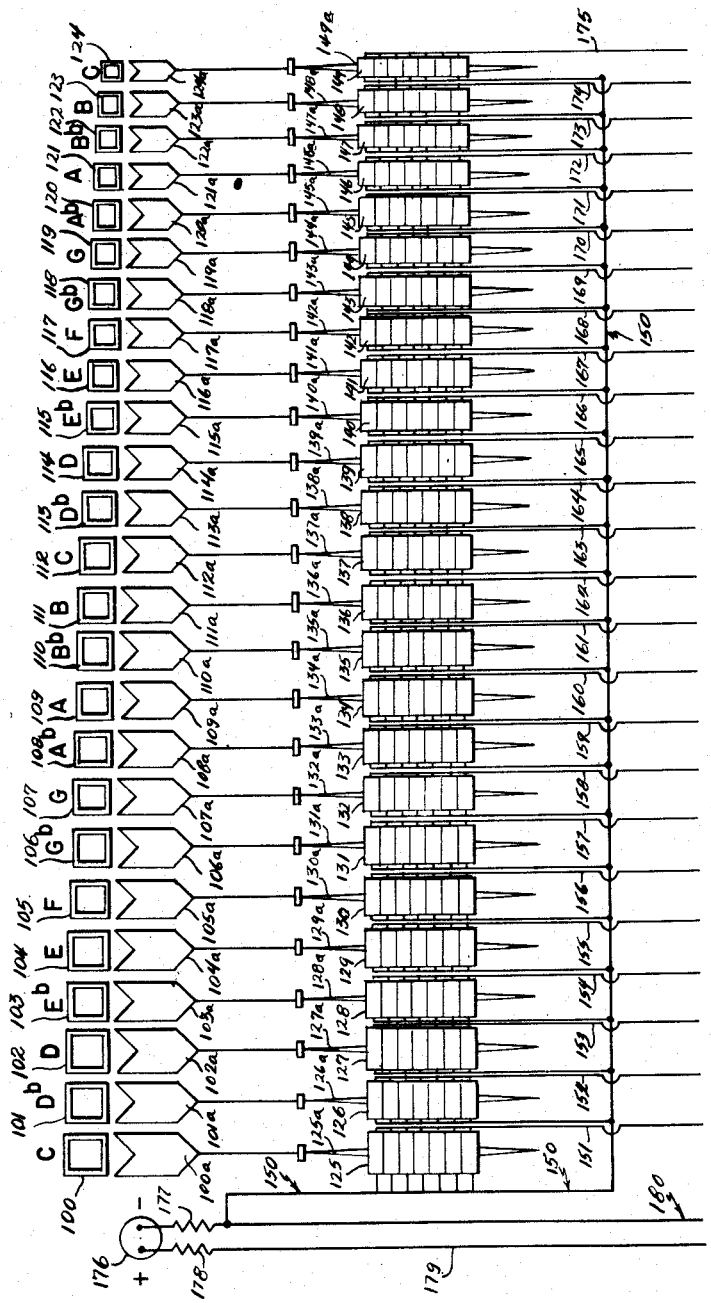
Figure 2:
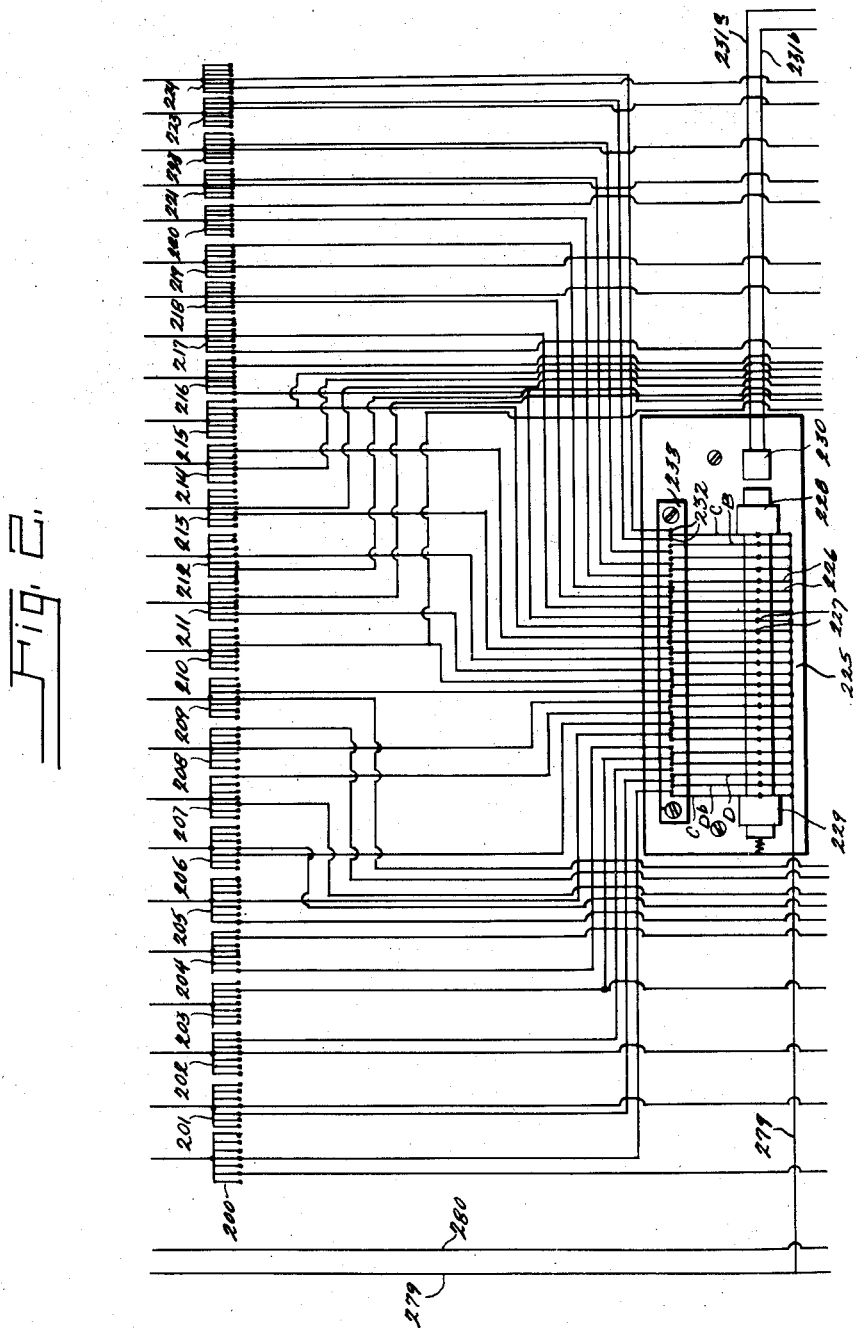

Referring to Figures 1, 2, 3 and 4 of the drawing, these figures when arranged with the righthand edge of Figure 1 against the lefthand edge of Figure 2 and with the righthand edge of Figure 2 against the lefthand edge of Figure 3 and with the righthand edge of Figure 3 against the lefthand edge of Figure 4 constitute a partial schematic wiring diagram of this electromagnetic organ control.

In this specification the items shown in Figure 1 are designated by reference numerals between 100 and 199; the items shown in Figure 2 are designated by reference numerals between 200 and 299; the items shown in Figure 3 are designated by reference numerals between 300 and 399; and the items shown in Figure 4 are designated by reference numerals between 400 and 499.

In Figure 1 there is illustrated the open ends of a series of twenty-five organ pipes 100 to 124 inclusive, and associated with the open ends of these organ pipes are a series of shades 100a to 124a inclusive, respectively. The pipes 100 to 124 inclusive comprise two octaves, the pipe 100 being middle C, pipe 112 corresponding to the C one octave above middle C and the pipe 124 corresponding to C two octaves above middle C, for example. In this scale the pipe 101 corresponds to D flat; pipe 102 corresponds to D; pipe 103, E flat; pipe 104, E; pipe 105, F; pipe 106, G flat; pipe 107, G; pipe 108, A flat; pipe 109, A; pipe 110, B flat; pipe 111, B. Taking the next octave beginning with pipe 112 which is C, pipe 113 corresponds to D flat, etc.

A plurality of multiple section solenoids 125 to 149 inclusive are associated with the organ pipe shades 100a to 124a inclusive, respectively. While each of these solenoids is illustrated as made up of seven sections, that is, seven windings placed side by side on a common axis, a lesser number such as five sections may be used, if desired. A terminal wire or lead of each of the seven solenoid sections of each of the solenoids 125 to 149 inclusive is connected to a common conductor 150. The other seven terminal wires or leads of each of the solenoid sections of each of the solenoids are connected to conductors in a cable that leads to terminals on one of the corresponding boards 200 to 224 inclusive, shown in Figure 2. The cables 151 to 175 inclusive, each of which is provided with seven conductors which may be coded are employed for this purpose. The seven conductors of cable 151 are connected to the seven sections respectively, of solenoid 125, and likewise the seven conductors of cable 152 are connected to the seven sections respectively, of the solenoid 126, etc.

The solenoids 125 to 149 inclusive are provided with armatures 125a to 149a inclusive, respectively, that are mechanically connected to the corresponding organ pipe shades by suitable adjustable screws. Thus, the solenoid 125 is provided with an armature 125a, one end of which is connected to the shade 100a. Solenoid 126 is provided with an armature 126a that is coupled to the shade 101a, etc. Each of the armatures per se may be considered as consisting of three sections, namely a central cylindrical section that is substantially shorter than the width of one of the seven solenoid sections, and two tapered sections extending along the axis of the corresponding solenoid on each side of the central cylindrical section. These features of construction will be described in detail hereinafter.

The pipes 100 to 124 inclusive are made of gradually decreasing cross-sectional area inasmuch as the frequencies of these pipes increase in accordance with a predetermined musical scale as previously described. Consequently the shades 100a to 124a are made gradually smaller and likewise the solenoids 125 to 149 are made gradually smaller and the armatures of these solenoids are also progressively reduced in size.

As pointed out above, one terminal of each of the seven sections of each of the solenoids 125 to 149 inclusive is connected to the common conductor 150 and this conductor is connected to the negative terminal of a direct current source of supply 176 through the resistor 177. The positive terminal of the source of current supply 176 is connected to the resistor 178 and to the conductor 179 through this resistor.

The cables 151 to 175 inclusive, respectively of Figure 1, are connected to the terminal boards 200 to 224 inclusive, respectively, of Figure 2. It will be noted that one of the terminal boards 200 to 224, inclusive, is provided for each of the solenoids 125 to 149, inclusive, and each of the boards 200 to 229, inclusive, consists of seven terminals connected to the respective coil sections of the aforesaid solenoids through the cables 151 to 175, inclusive, respectively. The terminals of the terminal boards 200 to 224, inclusive, are connected to selected contacts of different ones of 13 electro-magnetic switches. The two of these electro-magnetic switches are illustrated, namely, electro-magnetic switch 225 shown in Figure 2 and electro-magnetic switch 300 shown in Figure 3. These electro-magnetic switches are manufactured by the Reisner Manufacturing Company of Hagerstown, Maryland, for pipe organ controls. A switch 225 is controlled by the C tablet 400 and switch 300 is controlled by the C♯ or D♭ tablet 401. As pointed out above, 13 electro-magnetic switches such as switches 225 and 300 are employed and these are connected to be controlled by the manual tablets 400 to 412, inclusive, connections being provided between each of these tablets and the switches controlled thereby.

The switch 225 is provided with a plurality of leaf spring contacts 226 designated by the legends C, D♭, D, E♭, E, F, G♭, G, A♭, A, B♭, B, C, D♭, D, E♭, E, F, G♭, G, A♭, A, B♭, B and C. It will be noted that the number of these leaf spring contacts provided to the switch is the same as the number of pipes 100 to 124, inclusive.

These leaf spring contacts 226 are soldered to pins 227 carried by the armature of slider 228 that is journaled in the bearings 229. This slider 228 is made of magnetic material and associated therewith is a solenoid 230 that is adapted to be energized through the conductor 231 when the C tablet 400 is depressed. When the solenoid 230 is energized it sets up a magnetic field that attracts the armature 228 so that the leaf spring contacts 226 engage corresponding stationary contacts 232 supported by the insulation strip 233. The stationary contacts 232 are connected to different terminals of the terminal boards 200 to 224, inclusive. For example, proceeding from the left hand side of the diagram in Figure 2 the first stationary contact of the contact group 232 is connected to the fourth terminal of the board 200 and from this board to the fourth from the top solenoid section of the solenoid 125. The second contact of group 232 is connected to the third terminal of board 201 and to the third from the top section of the solenoid 126. The third contact of group 232 is connected to the sixth terminal of board 202 and to the sixth from the top section of solenoid 127. The fourth contact of group 232 is connected to the sixth terminal of board 203 and to the sixth from the top section of solenoid 128. The fifth contact of group 232 is connected to the first terminal of board 204 and to the top section of solenoid 129. The sixth contact of group 232 is connected to the fourth terminal of board 205 and to the center section of solenoid 130. The seventh contact of group 232 is connected to the third terminal of board 206 and to the third section from the top of solenoid 131. The eighth contact of group 232 is connected to the seventh terminal of board 207 and to the top section of the solenoid 132. The ninth contact of group 232 is connected to the fourth terminal of the board 208 and to the central section of the solenoid 133. The tenth contact of group 232 is connected to the fifth terminal of board 209 and to the fifth section of the solenoid 134. The contact 11 of group 232 is connected to the fifth terminal of board 210 and to the fifth section of the solenoid 135. Contact 12 of group 232 is connected to terminal 2 of the board 211 and to the second section of solenoid 136. Contact 13 of group 232 is connected to terminal 4 of the board 212 and to the central section of solenoid 137. Contact 14 of group 232 is connected to terminal 3 of board 213 and to the third section of solenoid 138. Contact 15 of group 232 is connected to terminal 6 of the board 214 and to the sixth section of solenoid 139. Contact 16 of group 232 is connected to the sixth terminal of the board 215 and to the sixth section of solenoid 140. Contact 17 is connected to the first terminal of board 216 and to the first section of solenoid 141. Contact 18 is connected to terminal 4 of the board 217 and to the central section of solenoid 142. Contact 19 is connected to terminal 3 of the board 218 and to the third section of solenoid 143. Contact 20 is connected to the seventh terminal of the board 219 and to the seventh section of solenoid 144. Contact 21 is connected to the fourth terminal of the board 220 and to the central section of the solenoid 145. Contact 22 is connected to the fifth terminal of board 221 and to the fifth section of solenoid 146. Contact 23 is connected to the fifth terminal of board 222 and to the fifth section of the solenoid 147. Contact 24 is connected to the sixth terminal of board 223 and to the sixth section of solenoid 148. Contact 25 is connected to the fourth terminal of the board 224 and to the central section of solenoid 149.

As previously described one terminal of each of the sections of each of the solenoids 125 to 149, inclusive, is connected to the current supply conductor 150 that in turn is connected to the negative terminal of the source of current supply 176 as shown in Figure 1. The positive terminal of the source of current supply 176 is connected to the conductor 179 of Figure 1 that is connected to conductor 279 of Figure 2 and it will be noted that this conductor 279 is connected to all of the leaf spring contacts 226 of the switch 225. Consequently, when the switch 225 is closed, that is when the solenoid 230 is energized by closing the C tablet 400, the different coil sections of the solenoids 125 to 149, inclusive, connected to the contact group 232 are energized and function to move the armatures 125a to 149a, inclusive, respectively, associated with these solenoids, so that the central cylindrical portions of these armatures will be centrally disposed with respect to the corresponding solenoid sections that are energized. As a result, the shades 100a to 129a, inclusive, controlled by the armatures 125a to 149a, inclusive, respectively, will be moved to tune the pipes 100 to 124, inclusive, respectively, to just pitch in C.

As previously mentioned an electro-magnetic switch such as the switch 225 is connected to be controlled by each of the 13 tablets 400 to 412, inclusive, and the solenoid 232 of the switch 225 is connected by the wires 231a and 231b to the wires 379a and 380a respectively of Figure 4 so that the circuit to this solenoid 230 is closed when the contacts 400a and 400b of the C tablet are closed, in as much as closing these contacts closes the circuit between the wire 481 and the wire 479.

The C♯ or D♭ tablet 401 is arranged to control the contacts 401a and 401b. Contact 401a is connected to the current supply conductor 479 and contact 401b is connected to the conductor 482 that is connected to the conductor 382 leading to the solenoid 330 of the electro-magnetic switch 300. The conductor 383 connected to the solenoid 330 is connected to the supply conductors 483 and 480 of Figure 4 so that when the D♭ tablet 401 is depressed to close the contacts 401a and 401b thereof the solenoid 330 of the switch 300 is energized from the current supply source 176.

The switch 300 is the same as the switch 225 and is likewise provided with 25 leaf spring contacts 326 attached to pins 327 carried by the armature 328 that is of magnetic material and is associated with the solenoid 330. All of the leaf spring contacts 326 are connected together to the current supply conductor 379. Associated with the contacts 326 are stationary contacts 332 supported by pins positioned on the insulation strip 333. The contact group 332 also includes 25 contacts, that is, one contact for each of the solenoids 125 to 149, inclusive, the same as the electro-magnetic switch 225. However, the contacts of the group 332 are connected to sections of the solenoids 125 to 149, inclusive, such that when these sections are energized the magnetic fields thereof will move the solenoid armatures 125a to 149a, inclusive, respectively, and the shades 100a to 124a, inclusive, respectively, associated with these armatures, to positions whereby the organ pipes 100 to 124, inclusive, are tuned to just pitch in D♭.

Similarly an electro-magnetic switch is provided to be controlled by the D tablet 402 to energize the solenoids 125 to 149, inclusive, so that these solenoids will move the respective armatures thereof to positions such that the shades 100a to 124a are adjusted with respect to the ends of the organ pipes 100 to 124 respectively whereby these pipes are tuned to just pitch in D. The tablet 403 is likewise arranged to control another switch that is connected to tune the pipes to just pitch in E♭. Tablet 404 controls the tuning of the pipes to just pitch in E and so on, tablets 405, 406, 407, 408, 409, 410 and 411 being connected to electro-magnetic switches arranged to adjust the tuning of the pipes to just pitch in F, G♭, G, A♭, A, B♭, and C♭, respectively. The additional tablet 412 is provided for the purpose of adjusting the tuning shades 100a to 124a to positions whereby the pipes 100 to 124 respectively are tuned to the equal tempered scale.

As pointed out hereinbefore, the solenoids 125 to 149 inclusive may each be made up of five winding sections instead of seven sections. Numbering these five sections of each of the solenoids 125 to 149, inclusive, from 1 to 5 beginning with the uppermost section, the winding sections 3, 2, 1, 2, 1, 4, 2, 5, 2, 1, 2, 1, 3, 2, 1, 2, 1, 4, 2, 5, 2, 1, 2, and 1 of the solenoids 125 to 149 inclusive, respectively, are connected to be energized when C tablet 400 is depressed and the contacts 400a and 400b are closed so that the pipes 100 to 124 inclusive are tuned by the shades 100a to 124a to the key of C major. When the D flat tablet 401 is closed so that the pipes 100 to 124 are tuned to the key of D flat by the shades 100a to 124a, the coil sections 1, 3, 2, 1, 2, 1, 4, 2, 5, 2, 1, 2, 1, 3, 2, 1, 2, 1, 4, 2, 5, 2, 1, and 2 of the solenoids 125 to 149 inclusive, respectively are connected to be energized. Furthermore, if the pipes 100 to 124 are to be tuned to the key of D, the D tablet 402 is depressed so that coil sections 2, 1, 3, 2, 1, 2, 1, 4, 2, 5, 2, 1, 2, 1, 3, 2, 1, 2, 1, 4, 2, 5, 2 and 1 are energized and move the tuning shades to tune the pipes 100 to 124 inclusive, respectively, to the key of D. When the E flat tablet 403 is closed the coil sections 1, 2, 1, 3, 2, 1, 2, 1, 4, 2, 5, 2, 1, 2, 1, 3, 2, 1, 2, 1, 4, 2, 5, and 2 of the solenoids 125 to 149 inclusive, respectively, are energized. When the E tablet 404 is closed the coil sections 2, 1, 2, 1, 3, 2, 1, 2, 1, 4, 2, 5, 2, 1, 2, 1, 3, 2, 1, 2, 1, 4, 2 and 5 of the solenoids 125 to 149 inclusive, respectively, are energized. Closing F tablet 405 closes the circuit to coil sections 5, 2, 1, 2, 1, 3, 2, 1, 2, 1, 4, 2, 5, 2, 1, 2, 1, 3, 2, 1, 2, 1, 4 and 2 of solenoids 125 to 149 inclusive, respectively. From the preceding illustrations, it will be observed that the solenoid sections are energized in a predetermined sequence by the tablets 400 to 412, inclusive to control the tuning of the pipes 100 to 124, inclusive, so that these pipes may be adjusted to produce different tones of the musical scale whereby the organ can be played in different keys simply by depressing different ones of the tablets 400 to 412. These tablets may be provided with suitable latches to hold them depressed until they are released so that the player need not hold them depressed while playing in the selected key.

In Figures 5, 6, 7, and 8, I have shown details of construction of the solenoid, solenoid armature, tuning shade, and tuning shade guides provided to each of the organ pipes 100 to 124, inclusive. In Figure 5, the solenoid 500, provided with 7 sections 501 to 507, inclusive, is positioned inside of a housing 508 that is illustrated partly cut away to show the solenoid sections. The housing 508 is attached to the brackets 509 that support the solenoid on the member 510. The center of the solenoid is provided with a tubular member 511 that forms a race for the central cylindrical section 512 of the armature 513. This central cylindrical section 512 is slightly shorter in length than the width of one of the coil sections 501 to 507, inclusive, of the solenoid. Tapered sections 514 and 515 are attached to each end of the central cylindrical section 512 of the armature. It has been found that by shaping the armature 513 with a central cylindrical section 512 and tapered sections 514 and 515 that the armature movement may be more accurately controlled and the armature section may be caused to stop dead in the solenoid section that is energized.

The smaller end of the tapered section 515 is attached by means of an adjusting screw, turnbuckle or suitable leverage 516 to the tuning shade 517, the sides of which are provided with suitable channels for engaging the guides 518 and 519 attached to the top or open end of the organ pipe 520. One end of the tuning shade 517 is partially cut away to form a V-shaped notch 521 to permit finer tuning adjustment of the pipes.

The V-shaped end of the tuning shade 517 is advanced over the opening end of the organ pipe when the solenoid 500 is energized and the position of the tuning shade 517 over the open end of the organ pipe 520 is determined by which section of the solenoid 500 is energized. If the section 501 is energized the tuning shade 517 is positioned over the open end of the pipe 520 so that the opening of the pipe 520 is entirely closed and the V-shaped notch portion of the tuning shade will be all the way across the organ pipe. On the other hand, if the solenoid section 507 is energized, the tuning shade occupies the position with respect to the organ pipe 520 shown in Figures 5 and 7. When the solenoid sections 502 to 506 inclusive, are energized separately, the tuning shade 517 occupies positions over the organ pipe 520 intermediate between the positions occupied when the sections 501 and 507 are energized so that the mouth of the organ pipe 520 is not completely closed by the tuning shade 517 when sections 502 to 506 inclusive, are energized. Thus, the tuning of the organ pipe 520 may be varied and controlled by energizing different ones of the solenoid sections 501 to 507, inclusive.

Generally before the tuning shades will tune the pipes exactly to the desired pitch, the edges 517a and 517b of the notch 521 must be filed as shown by the dotted lines, for example. These tuning shades are positioned about ⅛ inch from the open pipe top for installations where ½ inch of air pressure is employed on the pipes and when the shade covers the whole area of the pipe the flattest tone is produced. The position of the tuning shade varies with the wind pressure used which may be a low pressure of ½ inch or it may be a rather high pressure of 15 inches. However, the distance of the tuning shades is diminished gradually in the octaves above middle C so that at the higher frequencies it may be as short as 1/64 of an inch.

As previously described the seven sections of each of the solenoids are connected to be energized in accordance with predetermined patterns when the different tablets 400 to 412 are depressed so that the seven sections of the solenoids function to adjust the tuning of the respective pipes of the organ whereby the organ may be played in different keys and the organ pipes tuned in perfect intervals. The keys in which the organ may be played are indicated on the tablets 400 to 412 inclusive. The tuning shades and solenoids may be made adjustable if desired; however, when once adjusted and tuned the adjustment is stable over long periods of time. Thereafter the seven sections of each of the solenoids function to tune the organ pipes into just pitch in the different keys, each key, of course, having the same sequence.

This invention is applicable to the vertical or stopped pipes as well as to the horizontal or open pipes. The horizontal or open pipes have been shown in Figure 1 and also in Figure 5, 7 and 8 and the vertical or stopped pipe is shown in Figure 9. The same solenoid arrangement 523 is employed with the stopped or vertical pipe 522 as is employed with the open pipe inasmuch as the solenoid 523 is also divided into seven sections as previously described. The end of the pipe 522 is stopped by the plug 524, and tuning shade 525 controls a side opening of the pipe 522. The armature 526 of the solenoid is biased by the spring 527 that functions to maintain the armature and tuning shade in the upper position when the solenoid 523 is not energized.

While I have described an embodiment of this invention in detail it is of course understood that I do not desire to limit it to the exact details set forth except insofar as they are defined by the appended claims.

I claim:

1. An apparatus for tuning the pipes of a pipe organ to just pitch in different keys comprising a pipe organ having a plurality of pipes, said pipes being dimensioned to form a musical scale, a plurality of tuning shades, one of said tuning shades being associated with an opening of each of said pipes, a plurality of solenoids, each of said solenoids having an armature attached to one of said tuning shades, each of said solenoids having a plurality of windings positioned side by side in axial alignment such that when different sections of each of said solenoids are energized the corresponding tuning shade controlled thereby occupies a different position with respect to the organ pipe opening associated therewith, a plurality of tablet controlled switches, a plurality of electro-magnetic switches, each of said electro-magnetic switches being connected to be controlled by a different one of said tablet controlled switches, each of said electro-magnetic switches being connected to control the energization of predetermined ones of said solenoid windings so that said tuning tablets may be shifted to predetermined positions to tune the corresponding pipes to a predetermined key in just pitch upon the actuation of a predetermined one of said tablets.

2. An apparatus for tuning the pipes of a pipe organ to just pitch in different keys comprising a pipe organ having a plurality of pipes, said pipes being dimensioned to form a musical scale, tuning means associated with each of said pipes, a plurality of solenoids, each of said solenoids having an armature attached to one of said tuning means, each of said solenoids having means for variably controlling said tuning means associated therewith, a plurality of tablet controlled switches, a plurality of electro-magnetic switches, each of said electro-magnetic switches being connected to be controlled by a different one of said tablet controlled switches, each of said electro-magnetic switches being connected to control the energization of said solenoids so that said tuning means are energized to tune the corresponding pipes to a predetermined key in just pitch upon the actuation of a predetermined one of said tablets.

3. An apparatus for tuning an organ to just pitch in different keys comprising an organ having a plurality of sound producing elements, said elements being arranged to form a musical scale, a plurality of tuning devices, one of said tuning devices being associated with each of said sound producing elements, a plurality of solenoids, each of said solenoids having an armature attached to one of said tuning devices, each of said solenoids having a plurality of windings positioned side by side in axial alignment such that when different sections of each of said solenoids are energized the corresponding tuning device controlled thereby affects the tuning of the corresponding sound producing element, a plurality of tablet controlled switches, a plurality of electro-magnetic switches, each of electro-magnetic switches being connected to be controlled by a different one of said tablet controlled switches, each of said electro-magnetic switches being connected to control the energization of predetermined ones of said solenoid windings so that said tuning devices may be caused to tune the corresponding sound producing elements to a predetermined key in just pitch upon the actuation of a predetermined one of said tablets.

4. An apparatus for tuning an organ to just pitch in different keys comprising an organ having a plurality of sound producing elements, said elements being arranged to form a musical scale, tuning means associated with each of said sound producing elements, a plurality of solenoids, each of said solenoids having an amature attached to one of said tuning means, each of said solenoids having means for variably controlling said tuning means associated therewith, a plurality of tablet controlled switches, a plurality of electro-magnetic switches, each of electro-magnetic switches being connected to be controlled by a different one of said tablet controlled switches, each of said electro-magnetic switches being connected to control the energization of said solenoids so that said tuning means are energized to tune the corresponding sound producing elements to a predetermined key in just pitch upon the actuation of a predetermined one of said tablets.

5. Electro-magnetic apparatus for controlling the tuning of pipe organs comprising an organ pipe, a multiple section solenoid, an armature for said solenoid, said armature comprising a central cylindrical section having a length slightly less than the length of one of the sections of said solenoid and a pair of tapered sections extending from opposite ends of said central cylindrical section, and a tuning shade for said organ pipe attached to one of said tapered armature sections.

6. Electro-magnetic apparatus for controlling the tuning of pipe organs comprising an organ pipe, a solenoid having a plurality of sections arranged side by side with a common axis, an armature for said solenoids, said armature comprising a central cylindrical section having length slightly less than the length of one of the sections of said solenoid and a pair of tapered sections gradually tapering from opposite ends of said central cylindrical section, a tuning shade arranged to variably close an opening of said organ pipe, means for attaching said tuning shade to one of said tapered armature sections, and a source of current supply adapted to energize different ones of said solenoid sections for moving said tuning shade.

7. Electro-magnetic apparatus for controlling the tuning of pipe organs comprising an organ pipe, a multiple section solenoid, an armature for said solenoid, said armature comprising a central cylindrical section having length slightly less than the length of one of the sections of said solenoid and a pair of tapered sections extending from opposite ends of said central cylindrical section, and a tuning shade for said organ pipe attached to one of said tapered armature sections, said tuning shade being adapted to control the size of an opening of said organ pipe.

8. Electro-magnetic apparatus for controlling the tuning of pipe organs comprising an organ pipe, a multiple section solenoid, an armature for said solenoid, said armature comprising a central cylindrical section having length slightly less than the length of one of the sections of said solenoid and a pair of tapered sections extending from opposite ends of said central cylindrical section, a tuning shade for the open end of said organ pipe attached to one of said tapered armature sections, and guides for supporting said tuning shade.

9. Electro-magnetic apparatus for controlling the tuning of pipe organs comprising an organ pipe, a multiple section solenoid, an armature for said solenoid, said armature comprising a cylindrical section and a pair of tapered sections extending from opposite ends of said cylindrical section shaped to promote reliable dead stopping of said cylindrical section in the solenoid section that is energized, and a tuning shade for said organ pipe attached to one of said tapered armature sections.

ARTHUR JAMES CHASE.

REFERENCES CITED

The following references are of record in the file of this patent:

UNITED STATES PATENTS

| Number | Name | Date |
|---|---|---|
| 2,259,858 | Reid | Oct. 21, 1941 |